US011913873B2

(12) United States Patent
Cordoba Galera et al.

(10) Patent No.: US 11,913,873 B2
(45) Date of Patent: Feb. 27, 2024

(54) CLEANING SYSTEM FOR A SMOKE DETECTOR

(71) Applicant: Carrier Corporation, Palm Beach Gardens, FL (US)

(72) Inventors: Andrés Cordoba Galera, Barcelona (ES); Sergio Rodriguez Molpeceres, Barcelona (ES)

(73) Assignee: CARRIER CORPORATION, Palm Beach Gardens, FL (US)

(*) Notice: Subject to any disclaimer, the term of this patent is extended or adjusted under 35 U.S.C. 154(b) by 338 days.

(21) Appl. No.: 17/114,124

(22) Filed: Dec. 7, 2020

(65) Prior Publication Data

US 2021/0302303 A1 Sep. 30, 2021

(30) Foreign Application Priority Data

Mar. 30, 2020 (EP) ..................................... 20382246

(51) Int. Cl.
*G01N 21/15* (2006.01)
*G08B 17/103* (2006.01)

(52) U.S. Cl.
CPC ........... *G01N 21/15* (2013.01); *G08B 17/103* (2013.01); *G01N 2021/154* (2013.01)

(58) Field of Classification Search
CPC . G01N 21/15; G01N 2021/154; G08B 17/103
See application file for complete search history.

(56) References Cited

U.S. PATENT DOCUMENTS

| 9,925,570 B2 * | 3/2018 | Ji ........................... G01N 21/15 |
| 2005/0134468 A1 * | 6/2005 | Thomas ............... G08B 17/107 340/630 |
| 2007/0097366 A1 * | 5/2007 | LeBoeuf ............... G01N 21/532 356/338 |

FOREIGN PATENT DOCUMENTS

| EP | 1777670 A2 | 4/2007 | |
| GB | 2281619 A * | 3/1995 | ........... G08B 17/107 |
| GB | 2281619 A | 3/1995 | |
| GB | 2477763 A * | 8/2011 | ............. G08B 17/00 |
| GB | 2477763 A | 8/2011 | |

OTHER PUBLICATIONS

European Search Report for European Application No. 20382246.5; Report dated Aug. 13, 2020 (pp. 1-8).

* cited by examiner

*Primary Examiner* — Curtis A Kuntz
*Assistant Examiner* — James E Munion
(74) *Attorney, Agent, or Firm* — CANTOR COLBURN LLP

(57) ABSTRACT

An optical smoke detector 1 includes an ultrasonic transducer 4 configured to cause oscillations in its housing 2 so as to dislodge accumulated particulate matter from the walls of a sensor chamber or a labyrinth of the smoke detector 1. Additionally or alternatively, the ultrasonic transducer 4 may be configured to cause oscillations that dislodge accumulated particulate matter from a light source or a light receiver of the smoke detector 1.

4 Claims, 1 Drawing Sheet

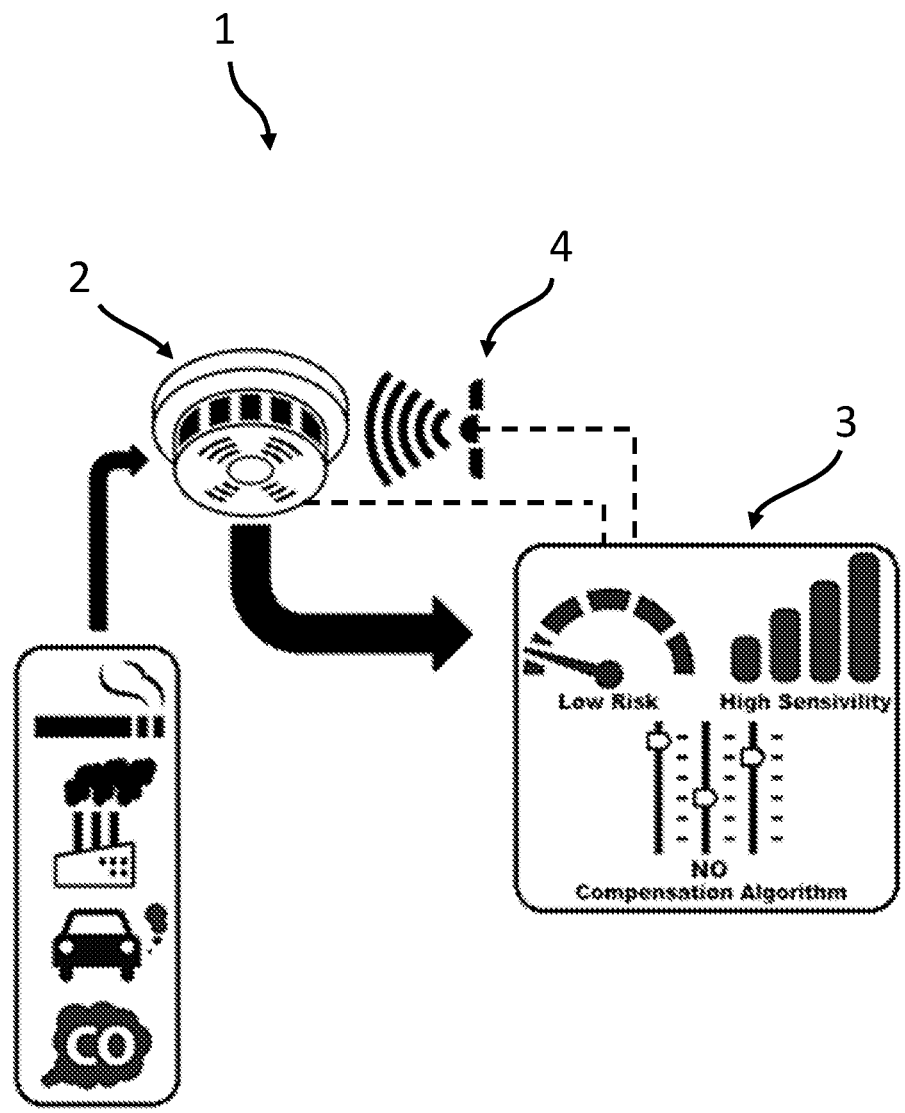

_(54) CLEANING SYSTEM FOR A SMOKE DETECTOR_

CROSS-REFERENCE TO RELATED APPLICATIONS

This application claims priority to European Patent Application No. 20382246.5, filed Mar. 30, 2020, the contents of which are incorporated by reference herein in their entirety.

BACKGROUND

The present disclosure relates to a cleaning system for a smoke detector, and particularly to a self-cleaning system for an optical smoke detector.

Optical smoke detectors (also known as photoelectric smoke detectors) commonly work using a light-scattering principle. The smoke detector contains a light source that emits a pulsed, infra-red light beam into a sensor chamber. A light detector is arranged so that it can detect light from the sensor chamber, but will not receive light directly from the light source. When smoke is present within the chamber, the beam is scattered by the smoke particles and the light detector can determine the quantity of smoke present within the sensor chamber.

An optical labyrinth connects the sensing chamber to an external environment such that ambient light cannot reach the sensor chamber, but air (and any smoke carried by the air) can enter the sensor chamber.

Typically, the internal walls of the sensor chamber will be black, so as to prevent light from the emitter being reflected by the walls to the detector. However, various contaminants in the air, such as dust, soot from combustion engines, and other pollutants will accumulate on the walls over time. These increase the amount of light reflected by the walls. Accumulated contaminants on the surfaces of the light source or detector can also decrease the amount of light transmitted or detected by these components.

Most optical smoke detectors are configured to compensate for this type of fouling using compensation software that automatically adjusts a sensitivity or other properties of the smoke detector. However, eventually, the smoke detector will reach a saturation limit requiring either replacement or manual disassembly and cleaning of the smoke detector.

A need therefore exists for an improved optical smoke detector.

SUMMARY

Viewed from a first aspect, the present disclosure provides an optical smoke detector comprising an ultrasonic transducer configured to cause oscillations to dislodge accumulated particulate matter from at least one component of the smoke detector.

The smoke detector may comprise a housing, and walls of the housing may define a sensor chamber and a labyrinth. The ultrasonic transducer is preferably configured to cause oscillations in the walls of the housing. Thus, the ultrasonic transducer may dislodge accumulated particulate matter from one or more wall at least partially defining the sensor chamber or the labyrinth. By generating oscillations in the housing, particulate fouling accumulated on the walls of the sensor chamber and/or the walls of the labyrinth can be dislodged and carried out of the smoke detector in the air. By reducing accumulated fouling, reflected light within the sensor chamber can be reduced.

The smoke detector may be configured to periodically activate the ultrasonic transducer. That is to say, the ultrasonic transducer may be automatically activated in response to expiry of a predetermined period of time since the last activation. Alternatively, or additionally, the smoke detector may be configured to activate the ultrasonic transducer in response to a detected or estimated degree of fouling exceeding a threshold value. The smoke detector may be configured to estimate a degree of fouling based on a level of light detected by the light detector when the sensor chamber does not contain smoke. This may be determined, for example, based on the levels of light detected by the light detector over a period of time.

The smoke detector preferably comprises a light source and a light detector. In one embodiment, the ultrasonic transducer may be configured to dislodge accumulated particulate matter from the light source and/or the light detector. For example, the ultrasonic transducer may be configured to directly cause oscillation of the light source and/or the light detector. Alternatively the ultrasonic transducer may be configured to cause oscillation of a housing, wherein the light source and/or the light detector is connected to the housing.

Preferably, the light source and light detector are configured such that the light source does not directly illuminate the light detector. For example, the housing may define a wall between the light source and the light detector. The light source is preferably configured to illuminate a gas within the sensor chamber. The light detector is preferably configured to detect scattered light from the sensor chamber, and particularly light from the light source that has been scattered by smoke within the sensor chamber.

The light source is preferably a light-emitting diode. The light source may be configured to emit infra-red, visible or ultraviolet light. Infra-red light is today the most commonly used, and the light source is preferably configured to emit infra-red light. The light source is preferably configured to emit pulsed light.

The light detector is preferably a photodiode receptor. The light detector is preferably configured to detect at least a frequency of light emitted by the light source.

The sensor chamber is preferably fluidly connected to an ambient environment outside of the smoke detector by the labyrinth. The labyrinth is preferably configured to permit flow of air into the sensor chamber. The labyrinth is preferably configured to block direct transmission of light from the ambient environment to the light detector and/or to the sensor chamber.

The smoke detector may be a smoke detector as described above.

A preferred embodiment of the present disclosure will now be described in greater detail, by way of example only and with reference to the sole FIGURE, which shows a smoke detector capable of performing automatic self-cleaning.

DRAWING DESCRIPTION

FIG. 1 depicts a smoke detector in an example embodiment.

DETAILED DESCRIPTION

An optical smoke detector 1 is shown in FIG. 1.

The smoke detector 1 comprises a housing 2 that defines a sensor chamber and a labyrinth. The housing 2 in this embodiment is formed from a plastic material in two parts that can be disassembled from one another. The labyrinth fluidly connects the sensor chamber to an ambient environment surrounding the smoke detector 1, so as to permit air to move freely between the sensor chamber and the ambient environment. However, the labyrinth is configured to prevent light from the external environment from entering the sensor chamber, i.e. such that there is no unimpeded straight-line path between the ambient environment and the sensor chamber.

The smoke detector 1 further comprises a controller 3, a light source and a light detector. The controller 3 may be an integrated within the housing 2, or may be external to the housing, for example as part of a centralised controller. The light source in this embodiment comprises an LED and is configured to emit light in the infra-red spectrum (wavelengths of 700 nm to 1 mm). The light detector in this embodiment comprises a photodiode receptor sensitive to at least the light emitted by the light source.

The light source is configured to emit a beam of light into the sensor chamber, and the light detector is configured to detect light from the beam of light scattered within the sensor chamber. However, the light source and light detector are configured such that light from the light source cannot directly hit the light detector. For example, the housing 2 may comprise a wall between the light source and the light detector that blocks direct transmission of light between the light source and the light detector.

The internal walls of the sensor chamber are either formed from or coated with a black material, so as to minimise reflection of light by the walls from the emitter to the detector.

The controller 3 is configured to cause the light source to emit a pulsed, light beam into the sensor chamber and to detect how much light is received by the light detector. When no smoke is present within the sensor chamber, the light beam is absorbed by the black material. When smoke is present within the chamber, the beam is scattered by the smoke particles. The degree of scattering is proportional to the quantity of smoke within the sensor chamber. Thus, the controller 3 can measure the quantity of smoke present within the sensor chamber.

Over time, various contaminants in the air, such as dust, soot from combustion engines, and other pollutants will accumulate on the walls of the labyrinth and the sensor chamber. These increase the amount of light reflected by the walls, which means that external light may reflect into the chamber via the walls of the labyrinth or that light from the light source may reflect off of the walls of the sensor chamber. Thus light may be detected by the light detector, even when no smoke is present within the sensor chamber.

The controller 3 of the smoke detector 1 comprises a compensation algorithm that automatically compensates for this type of fouling. The compensation algorithm may monitor base levels of light over an extended period of time, and determine a degree of fouling based on this level. The compensation algorithm may alter a sensitivity of the smoke detector 1 based on the degree of fouling.

The smoke detector 1 is further provided with an ultrasonic transducer 4. The ultrasonic transducer is configured to cause oscillations in the housing 2, and particularly in the walls of the sensor chamber and/or the labyrinth. The purpose of these oscillations is to dislodge accumulated particles fouling these walls.

The ultrasonic transducer 4 is activated by the controller 3 of the smoke detector 1. It may be actuated periodically. For example, the transducer 4 may be activated monthly, weekly, daily, or based upon any other periodic cycle. Alternatively, or additionally, it may be actuated based on an estimated or detected degree of fouling, such as determined by the compensation algorithm.

By automatically cleaning the smoke detector 1, manual maintenance can be reduced as the smoke detector 1 can remove a degree of fouling automatically. Indeed, in some embodiments, the compensation algorithm may no longer be required and thus may be omitted. By using ultrasonic vibrations, the cleaning of the smoke detector 1 will not disturb nearby people.

Whilst it is primarily envisaged that the ultrasonic transducer 4 will be used to dislodge accumulated particulate matter from the walls of the housing 2, in other embodiments the ultrasonic transducer 4 may be used to dislodge accumulated particulate matter from any component within the smoke detector 1 that requires cleaning. For example, the ultrasonic transducer 4 may be configured to generate oscillations to dislodge accumulated particulate matter from the light sensor and/or the light detector.

Whilst the ultrasonic transducer 4 has been described within the context of an optical smoke detector 1 having a housing, the principles discussed herein may be applied to a chamberless optical smoke detector. Chamberless optical smoke detectors operate on the same light-scattering principle as the described smoke detector 1, but have no sensor chamber and instead include additional sensors to automatically compensate for the presence of ambient light. In the context of a chamberless optical smoke detector, the ultrasonic transducer 4 may be arranged to dislodge accumulated particulate matter from the light sensor and/or light emitter, which are particularly prone to fouling due to the absence of a housing.

Furthermore, whilst the ultrasonic transducer 4 has been described within the context of a light-scattering optical smoke detector 1, it may also be employed for cleaning other types of optical smoke detectors, such as an optical beam smoke detector, which operates based on a principle of light obscuration (either by absorption or scattering of the light). In yet further examples, ultrasonic transducers may be used as described above to clean other types of smoke detector.

What is claimed is:
1. An optical smoke detector comprising:
   a sensor chamber, wherein internal walls of the sensor chamber are black;
   a housing having walls that define the sensor chamber and a labyrinth;
   a light source configured to illuminate a gas within the sensor chamber;
   a light detector configured to detect light from the light source that has been scattered by smoke within the sensor chamber; and
   an ultrasonic transducer configured to cause oscillations to dislodge accumulated particulate matter from at least one or more of the walls of the smoke detector that at least partially define the labyrinth;
   wherein the smoke detector is configured to automatically activate the ultrasonic transducer in response to an estimated degree of fouling on the one or more walls of the labyrinth exceeding a threshold value; and
   wherein the degree of fouling on the one or more walls of the labyrinth is estimated based on a level of light detected by the light detector that is configured to detect light from the light source that has been scattered by smoke within the sensor chamber, the degree of fouling being estimated based on a level of light detected when the sensor chamber does not contain smoke.

2. An optical smoke detector according to claim 1, wherein the smoke detector is configured to periodically activate the ultrasonic transducer.

3. An optical smoke detector according to claim 1, wherein the light source is a light-emitting diode.

4. An optical smoke detector according to claim 1, wherein the at least one component includes one or both of the light source and the light detector.

\* \* \* \* \*